US011657400B2

(12) United States Patent
Annadurai et al.

(10) Patent No.: US 11,657,400 B2
(45) Date of Patent: May 23, 2023

(54) LOSS PREVENTION USING VIDEO ANALYTICS

(71) Applicant: SENSORMATIC ELECTRONICS, LLC, Boca Raton, FL (US)

(72) Inventors: Sivaram Annadurai, Bangalore (IN); Satyajit Nair, Karnataka (IN); Rajkiran Kumar Gottumukkal, Bangaluru (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 173 days.

(21) Appl. No.: 16/805,298

(22) Filed: Feb. 28, 2020

(65) Prior Publication Data

US 2021/0097544 A1    Apr. 1, 2021

Related U.S. Application Data

(60) Provisional application No. 62/907,122, filed on Sep. 27, 2019.

(51) Int. Cl.
*G06Q 20/00*   (2012.01)
*G06Q 20/40*   (2012.01)
*G06K 7/10*    (2006.01)

(52) U.S. Cl.
CPC ..... *G06Q 20/4016* (2013.01); *G06K 7/10297* (2013.01)

(58) Field of Classification Search
CPC ...... G07G 3/00; G07G 1/0063; G07G 1/0054; G07G 1/009; G06K 7/10297; G06Q 20/4016; G06Q 20/208

USPC .................................................. 705/35–45
See application file for complete search history.

(56) References Cited

U.S. PATENT DOCUMENTS

| 7,620,568 | B1 | 11/2009 | Parker-Malchak |
| 2012/0127314 | A1 | 5/2012 | Clements |
| 2012/0320199 | A1* | 12/2012 | Kundu ............... G06Q 20/208 348/143 |
| 2018/0165733 | A1* | 6/2018 | Kundu ............... G06Q 30/0609 |
| 2018/0341842 | A1 | 11/2018 | Egan |

(Continued)

OTHER PUBLICATIONS

Dialog NPL (Non-Patent Literature) Search Report, dated Oct. 20, 2021. (Year: 2021).*

(Continued)

*Primary Examiner* — Hai Tran
(74) *Attorney, Agent, or Firm* — ArentFox Schiff

(57) ABSTRACT

Aspects of the present disclosure include methods, systems, and non-transitory computer readable media that perform the steps of receiving a visual code identifier associated with a transaction of one or more transaction merchandises, receiving a radio frequency identification (RFID) identifier associated with the transaction, analyzing the image, determining at least one of one or more detected merchandises, a number of the one or more detected merchandises, and a price of the one or more detected merchandises based on information in the RFID identifier and the analyzed image, determining a merchandise discrepancy, a number discrepancy, or a price discrepancy, and transmitting, in response to determining the at least one of the merchandise discrepancy, the number discrepancy, or the price discrepancy, an alert.

20 Claims, 5 Drawing Sheets

(56) References Cited

U.S. PATENT DOCUMENTS

2019/0034897 A1* 1/2019 Gao .................... G06Q 20/202

OTHER PUBLICATIONS

Dialog NPL (non-patent literature) Search, dated Mar. 4, 2022. (Year: 2022).*
Google NPL (non-patent literature) Search, dated Mar. 4, 2022. (Year: 2022).*
Google Scholar Search, dated Mar. 4, 2022. (Year: 2022).*

* cited by examiner

LOSS PREVENTION USING VIDEO ANALYTICS

CROSS-REFERENCE TO RELATED APPLICATIONS

The current application claims priority to U.S. Provisional Application No. 62/907,122 filed on Sep. 27, 2019, entitled "Loss Prevention Using Video Analytics," the contents of which are incorporated by reference in their entireties.

BACKGROUND

In an retail environment, lost, stolen, or misplaced merchandises may result in loss revenue for the store. For example, a customer may shoplift an expensive merchandise by placing a price tag of a cheaper merchandise onto the expensive merchandise. As a result, at the point of sale, the customer may pay the price of the cheaper merchandise for the expensive merchandise. In another example, a shoplifter may make a purchase and place additional unpaid merchandise into the shopping bag when leaving the store. Other forms of loss may involve the store employees. For example, "sweet hearting" occurs when a store employee colludes with a customer to shoplift (e.g., swapping price tag, charging the price of one item for multiple items). Therefore, improvements in loss prevention may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods, systems, and non-transitory computer readable media that perform the steps of receiving a visual code identifier associated with a transaction of one or more transaction merchandises, receiving a radio frequency identification (RFID) identifier associated with the transaction, analyzing the image, determining at least one of one or more detected merchandises, a number of the one or more detected merchandises, and a price of the one or more detected merchandises based on information in the RFID identifier and the analyzed image, determining a merchandise discrepancy, a number discrepancy, or a price discrepancy, and transmitting, in response to determining the at least one of the merchandise discrepancy, the number discrepancy, or the price discrepancy, an alert.

An aspect of the present disclosure includes a method including receiving a visual code identifier associated with a transaction of one or more transaction merchandises, wherein the visual code identifier indicates at least one of the one or more transaction merchandises, a number of the one or more transaction merchandises, or a price of the one or more transaction merchandises, receiving a radio frequency identification (RFID) identifier associated with the transaction, wherein the RFID identifier indicates at least one of the one or more scanned merchandises, a number of the one or more scanned merchandises, or a price of the one or more scanned merchandises, receiving an image associated with the transaction, analyzing the image to determine at least one of the one or more imaged merchandises, a number of the one or more imaged merchandises, or a price of the one or more imaged merchandises, determining at least one of one or more detected merchandises, a number of the one or more detected merchandises, and a price of the one or more detected merchandises based on information in the RFID identifier and the analyzed image, determining at least one of a merchandise discrepancy between the one or more transaction merchandises and the one or more detected merchandises, a number discrepancy between the number of the one or more transaction merchandises and the number of the one or more detected merchandises, or a price discrepancy between the price of the one or more transaction merchandises and the price of the one or more detected merchandises, and transmitting, in response to determining the at least one of the merchandise discrepancy, the number discrepancy, or the price discrepancy, an alert.

Aspects of the present disclosure includes a system having a memory that stores instructions and a processor configured to execute the instructions to perform the steps of receiving a visual code identifier associated with a transaction of one or more transaction merchandises, wherein the visual code identifier indicates at least one of the one or more transaction merchandises, a number of the one or more transaction merchandises, or a price of the one or more transaction merchandises, receiving a radio frequency identification (RFID) identifier associated with the transaction, wherein the RFID identifier indicates at least one of the one or more scanned merchandises, a number of the one or more scanned merchandises, or a price of the one or more scanned merchandises, receiving an image associated with the transaction, analyzing the image to determine at least one of the one or more imaged merchandises, a number of the one or more imaged merchandises, or a price of the one or more imaged merchandises, determining at least one of one or more detected merchandises, a number of the one or more detected merchandises, and a price of the one or more detected merchandises based on information in the RFID identifier and the analyzed image, determining at least one of a merchandise discrepancy between the one or more transaction merchandises and the one or more detected merchandises, a number discrepancy between the number of the one or more transaction merchandises and the number of the one or more detected merchandises, or a price discrepancy between the price of the one or more transaction merchandises and the price of the one or more detected merchandises, and transmitting, in response to determining the at least one of the merchandise discrepancy, the number discrepancy, or the price discrepancy, an alert.

Certain aspects of the present disclosure includes a non-transitory computer readable medium having instructions stored therein that, when executed by a processor, cause the processor to perform the steps of receiving a visual code identifier associated with a transaction of one or more transaction merchandises, wherein the visual code identifier indicates at least one of the one or more transaction merchandises, a number of the one or more transaction merchandises, or a price of the one or more transaction merchandises, receiving a radio frequency identification (RFID) identifier associated with the transaction, wherein the RFID identifier indicates at least one of the one or more scanned merchandises, a number of the one or more scanned merchandises, or a price of the one or more scanned merchandises, receiving an image associated with the transaction, analyzing the image to determine at least one of the one or more imaged merchandises, a number of the one or more imaged merchandises, or a price of the one or more imaged merchandises, determining at least one of one or more detected merchandises, a number of the one or more detected merchandises, and a price of the one or more detected merchandises based on information in the RFID identifier and the analyzed image, determining at least one of a merchandise discrepancy between the one or more transaction merchandises and the one or more detected merchandises, a number discrepancy between the number of the one or more transaction merchandises and the number of the one or more detected merchandises, or a price discrepancy between the price of the one or more transaction merchandises and the price of the one or more detected merchandises, and transmitting, in response to determining the at least one of the merchandise discrepancy, the number discrepancy, or the price discrepancy, an alert.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

In some aspects of the present disclosure, a loss prevention method may include using image analytics by a neural network to determine the price of a merchandise at or around the point of sale. If the price determined by the image analytics is different than the price indicated at the point of sale (e.g., by scanning a bar code on the merchandise), an alert may be sent to the store personnel (e.g., security personnel, manager, or employee) indicating the discrepancy in prices.

Figure 1:
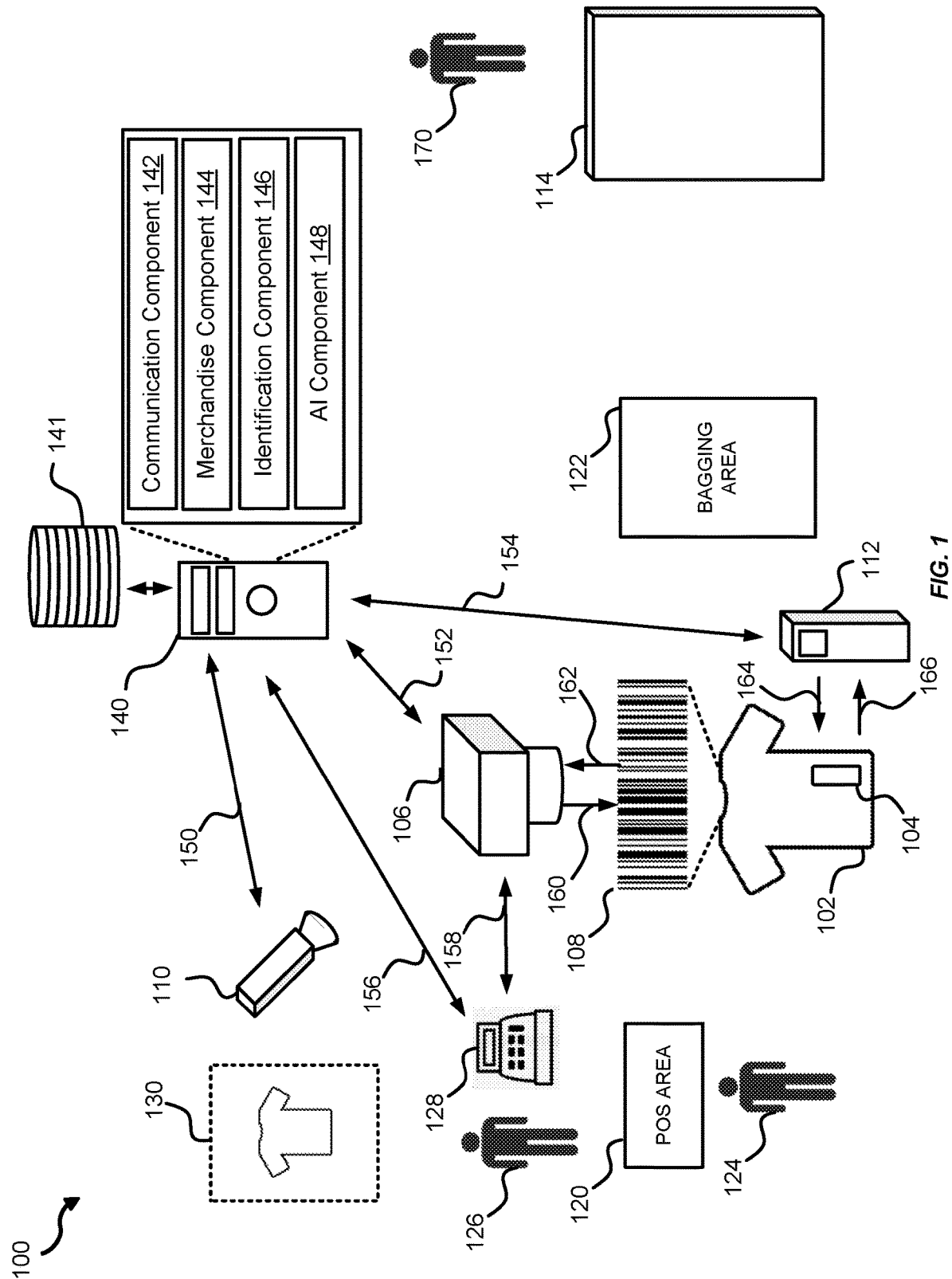
FIG. 1 illustrates an example of an environment for implementing loss prevention using image analytics in accordance with aspects of the present disclosure.

Referring to FIG. 1, in a non-limiting implementation, an example of an environment 100 (e.g., a retail store) for loss prevention according to aspects of the present disclosure. The environment may include a merchandise 102 having a radio frequency identification (RFID) tag 104 attached to the merchandise 102. The environment 100 may include a visual code scanner 106 for scanning a visual code 108 (e.g., a bar code, a QR code, etc.) as described below. The visual code 108 may be associated with the merchandise 102. For example, the visual code 108 may be printed on a price tag (not shown) or a neck tag (not shown). The environment 100 may include a RFID reader 112 that reads the content of the RFID tag 104 as described below. The environment 100 may include one or more cameras 110 that captures one or more images 130 in or near a point of sale (POS) area 120, a bagging area 122, or other areas in the environment 100. The environment 100 may optionally include a RFID monitor 114 (e.g., an RFID pedestal) that reads the content of the RFID tag 104 and/or tracks the location(s) of the RFID tag 104. The RFID monitor 114 may be placed at an entrance of the retail store to track merchandises leaving the store. In some instances, one or more RFID monitors may be placed at one or more entrances/exits of the store.

In some implementations, the environment 100 may include a server 140 and an optional data repository 141. The server 140 may include a communication component 142 that sends and/or receives data to/from other devices (explained below). The server 140 may include a merchandise component 144 that determines the merchandise (such as the merchandise 102) based on the information from scanning the visual code 108. The server 140 may include an identification component 146 that identifies the merchandise (such as the merchandise 102) based on the information in the one or more images 130 by the one or more cameras 110 and/or the information from scanning the RFID tag 104. The server 140 may include an artificial intelligence (AI) component 148 that identifies the merchandise (such as the merchandise 102) based the one or more images 130. The server 140 may communicate with the one or more cameras 110, the visual code scanner 106, the RFID reader 112, and/or a cash register 128 via communication links 150, 152, 154, 156. The communication links 150, 152, 154, 156 may be wired or wireless communication channels.

During operation, in some implementations, a customer 124 may attempt to purchase the merchandise 102. A clerk 126 or the customer 124 may scan the visual code 108 with the visual code scanner 106 to determine a price for the merchandise 102. In one example, the visual code scanner 106 may transmit a light 160 (e.g., a laser) toward the visual code 108 and detect a reflected light 162. Based on the reflected light 162, the visual code scanner 106 may determine a visual code identifier associated with the visual code 108. The visual code scanner 106 may transmit the visual code identifier to the server 140 via the communication link 152. The merchandise component 144 may utilize the visual code identifier associated with the visual code 108 to determine a first price based on the visual code 108.

In some variations, the RFID reader 112 may transmit an interrogating signal 164 to the RFID tag 104, and receive, in response to the interrogating signal 164, a response signal 166 from the RFID tag 104. The response signal 166 may include a RFID identifier. The RFID reader 112 may transmit the RFID identifier to the server 140 via the communication link 154. The merchandise component 144 may utilize the RFID identifier associated with the RFID tag 104 to determine a second price based on the RFID tag 104.

In some examples, the one or more cameras 110 may capture the one or more images 130. The one or more cameras 110 may transmit the one or more images 130 to the server 140 via the communication link 150. The merchandize component 144, the identification component 146, and/or the AI component 148 may determine a third price based on the one or more images 130 (described below).

In some implementations, the merchandise component 144 may use one or more of the first price, second price, and/or third price to reduce loss. For example, if the first price is different (e.g., lower) than the second price, the merchandise component 144 may determine that the first price may not be the proper price for the merchandise 102. In another example, if the first price is different (e.g., lower) than the third price, the merchandise component 144 may determine that the first price may not be the proper price for the merchandise 102. In a non-limiting example, if the first price is different (e.g., lower) than the second price and the third price, the merchandise component 144 may determine that the first price may not be the proper price for the merchandise 102.

In one example of a scenario, the customer 124 may attempt to purchase the merchandise 102 at a price lower than the retail price of the merchandise 102. The merchandise 102 may include the RFID tag 104 associated with the merchandise 102. Prior to approaching the POS area 120, the customer 124 may remove a correct visual code (not shown) associated with the merchandise 102 and replace the correct visual code with the visual code 108 associated with another merchandise (not shown) of lower price. When the clerk 126 utilizes the visual code scanner 106 to scan the visual code 108, the cash register 128 communicatively coupled with the visual code scanner 106 via a communication link 158 may display the lower price of another merchandise (e.g., $50). The visual code scanner 106 may transmit the visual code identifier to the server 140. The RFID reader 112 may scan the RFID tag 104 and transmit the RFID identifier to the server 140. Based on the visual code identifier, the merchandise component 144 may determine the price for the merchandise 102 is $50. However, based on the RFID identifier, the merchandise component 144 may determine the price for the merchandise 102 is $100. In response to detecting the discrepancy in prices, the communication component 142 may transmit an alert to store personnel 170. The store personnel 170 may track the merchandise 102 as the customer 124 passes the RFID monitor 114. In one example, the one or more cameras 110 may record the customer 124 passing the RFID monitor 114 with the merchandise 102.

In another example of a scenario, the customer 124 may attempt to purchase the merchandise 102 at a price lower than the retail price of the merchandise 102 by colluding (because the clerk 126 may be a relative or a friend of the customer 124) with the clerk 126. As the customer 124 approaches the POS area 120, the clerk 126 may remove a correct visual code (not shown) associated with the merchandise 102 and replace the correct visual code with the visual code 108 associated with another merchandise (not shown) of lower price. The clerk 126 may also collude with the customer 124 by knowingly scanning a different merchandise (e.g., merchandise 102) and placing an un-scanned item in the shopping bag. When the clerk 126 utilizes the visual code scanner 106 to scan the visual code 108, the cash register 128 connected to the visual code scanner 106 may display the lower price of another merchandise (e.g., $90). The visual code scanner 106 may transmit the visual code identifier to the server 140. The one or more cameras 110 may capture the one or more images 130 associated with the merchandise 102. Based on the visual code identifier, the merchandise component 144 may determine the price for the merchandise 102 is $90. However, based on the one or more images 130, the merchandise component 144 may determine the price for the merchandise 102 is $200 (discussed in more detail below). In response to detecting the discrepancy in prices, the communication component 142 may transmit an alert to the store personnel 170. The store personnel 170 may track the merchandise 102 as the customer 124 passes the RFID monitor 114. In one example, the one or more cameras 110 may record the customer 124 passing the RFID monitor 114 with the merchandise 102.

In a different scenario, the customer 124 may attempt to purchase the merchandise 102 while stealing a second merchandise with the assistance of the clerk 126. When the clerk 126 utilizes the visual code scanner 106 to scan the visual code 108, the cash register 128 connected to the visual code scanner 106 may display the price of the merchandise 102 (e.g., $25). The clerk 126 may intentionally not scan the second merchandise so the customer 124 does not have to pay for price of the second merchandise (e.g., $60). The visual code scanner 106 may transmit the visual code identifier to the server 140. The one or more cameras 110 may capture the one or more images 130 associated with the merchandise 102 and the second merchandise. Based on the visual code identifier, the merchandise component 144 may determine the price for the merchandise 102 is $25. However, based on the one or more images 130, the merchandise component 144 may determine the price for the merchandise 102 is $60 and the price for the second merchandise is $60. Therefore, the customer 124 should pay $85 for the merchandise 102 and the second merchandise instead of $25 for the merchandise 102 only. In response to detecting the discrepancy in prices, the communication component 142 may transmit an alert to the store personnel 170. The store personnel 170 may track the second merchandise as the customer 124 passes the RFID monitor 114 (e.g., by tracking the RFID tag 104 of the merchandise 102). In one example, the one or more cameras 110 may record the customer 124 passing the RFID monitor 114 with the second merchandise.

In a non-limiting example of a scenario, the customer 124 may attempt to purchase the merchandise 102 at a price lower than the retail price of the merchandise 102 by colluding with the clerk 126. The merchandise 102 may include the RFID tag 104 associated with the merchandise 102. The clerk 126 may input a price lower than the retail price of the merchandise 102 into the cash register 128 (e.g., $50). Alternatively, the clerk 126 may scan a lower priced item. The cash register 128 may transmit the lower price to the server 140 via the communication link 156. The RFID reader 112 may scan the RFID tag 104 and transmit the RFID identifier to the server 140. Based on the RFID identifier, the merchandise component 144 may determine the price for the merchandise 102 is $100. In response to detecting the discrepancy in prices, the communication component 142 may transmit an alert to the store personnel 170. The store personnel 170 may track the merchandise 102 as the customer 124 passes the RFID monitor 114. In one example, the one or more cameras 110 may record the customer 124 passing the RFID monitor 114 with the merchandise 102.

Figure 2:
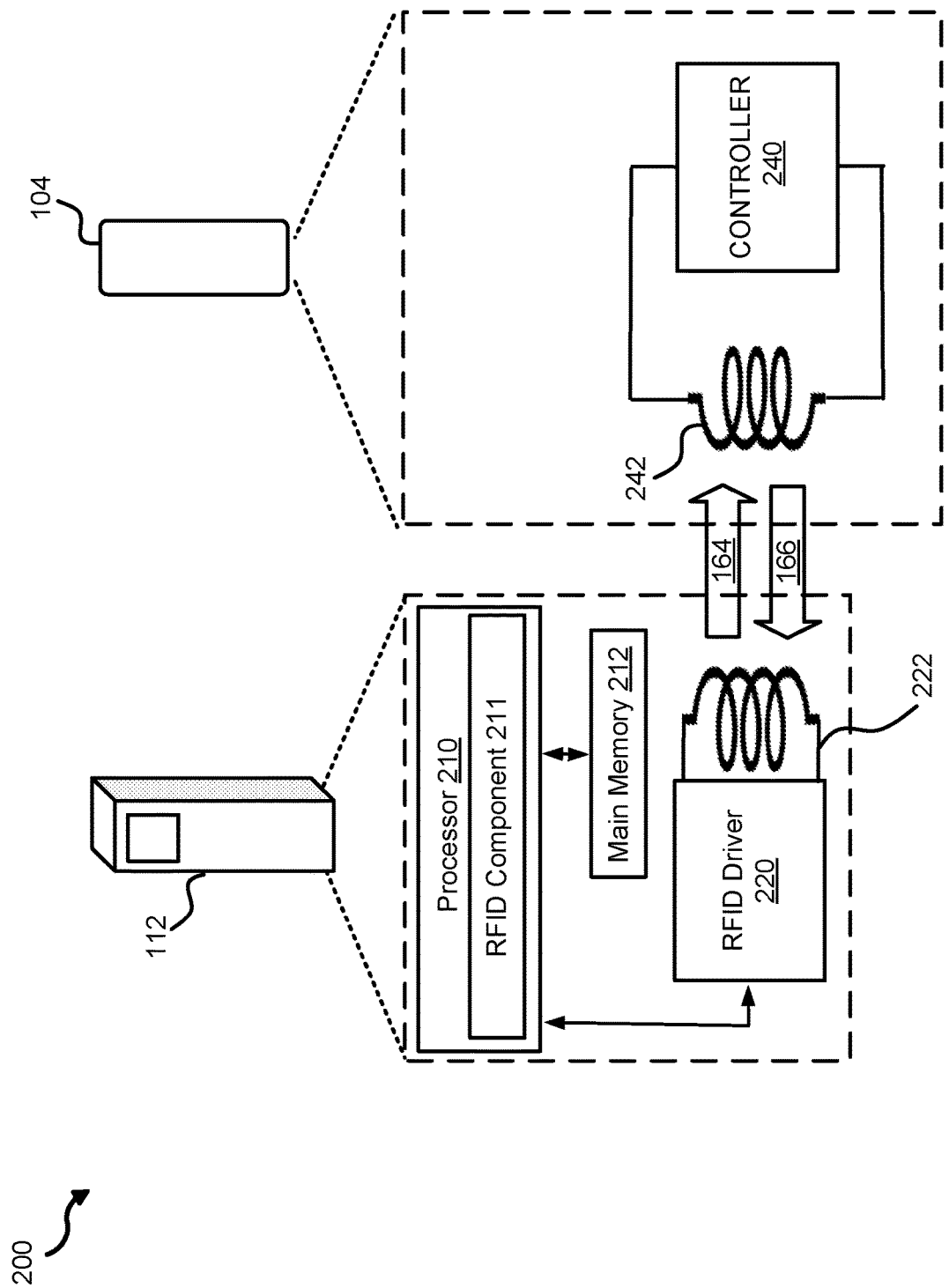
FIG. 2 illustrates an example of a radio frequency identification (RFID) system in accordance with aspects of the present disclosure.

Referring to FIGS. 1 and 2, an example of a RFID system 200 may include the RFID reader 112 for scanning the RFID tag 104 may include a processor 210 that executes instructions stored in a main memory 212 for performing the deactivating functions described herein. The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The processor 210 may include the RFID component 211 that causes the RFID driver 220 to transmit the interrogating signal 164, via a transmitting coil 222, to the RFID tag 104. The RFID driver 220 may energize the transmitting coil 222 to transmit the interrogating signal 164. The transmitting coil 222 may include one or more inductors that transmit or receive electromagnetic signals.

Additionally, in some non-limiting examples, the RFID tag 104 may include a controller 240 that generates the response signal 166 in response to receiving the interrogating signal 164. The RFID tag 104 may include a tag coil 242 configured to receive the interrogating signal 164 from the transmitting coil 222.

During operation, in some implementations, the processor 210 and/or the RFID component 211 may cause the RFID driver 220 to transmit the interrogating signal 164 via the reader coil 222. The tag coil 242 of the RFID tag 104 may receive the interrogating signal 164. An electrical current generated from the reception of the interrogating signal 164 may flow to the controller 240 to provide electrical energy to the controller 240.

In response to receiving the interrogating signal 164, the controller 240 may generate the response signal 166. The response signal 166 may include the RFID identifier that may be associated with a merchandise, such as the merchandise 102. The controller 240 may transmit the response signal 166 via the tag coil 242 back to the reader coil 222.

In certain implementations, the interrogating signal 164 may be a direct current signal or an alternative current signal. The interrogating signal 164 may use less than 1 milli-Joules (mJ), 0.5 mJ, 0.3 mJ, 0.1 mJ, 0.05 mJ, or 0.01 mJ.

Figure 3:
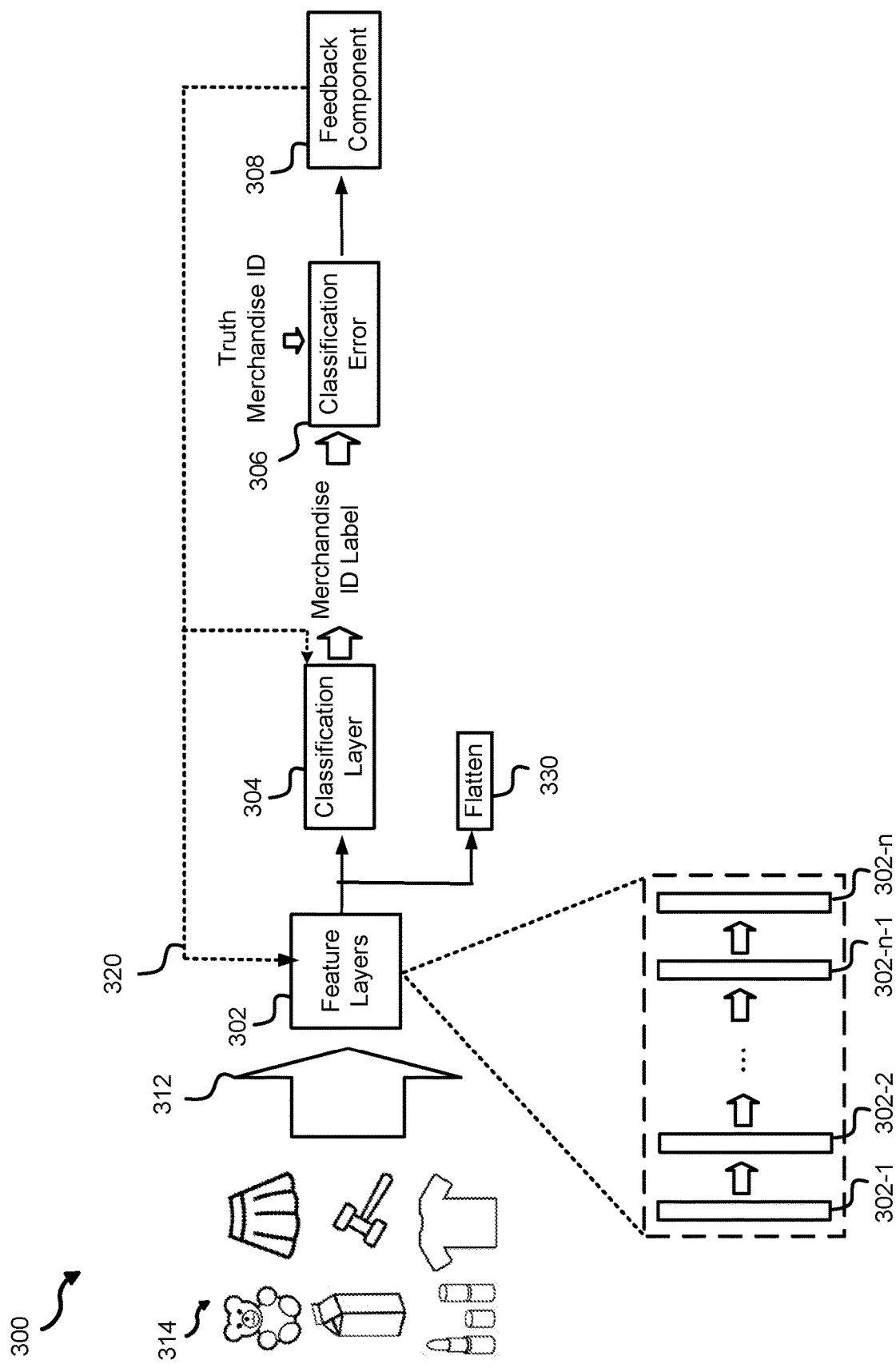
FIG. 3 illustrates an example of a method for training a neural network for image analytics in accordance with aspects of the present disclosure.

Turning to FIG. 3, an example of training a neural network 300 for merchandise identification may include feature layers 302 that receive training images 312 of store merchandises 314. The training images 312 may include images of the store merchandises 314 from different angles, under different lighting conditions, partial images of the store merchandises 314, etc. The store merchandises 314 may be some or all of the items to be sold in the store. The feature layers 302 may be a deep learning algorithm that includes feature layers 302-1, 302-2 . . . , 302-$n$-1, 302-$n$. Each of the feature layers 302-1, 302-2 . . . , 302-$n$-1, 302-$n$ may perform a different function and/or algorithm (e.g., pattern detection, transformation, feature extraction, etc.). In a non-limiting example, the feature layer 302-1 may identify edges of the training images 312, the feature layer 302-$b$ may identify corners of the training images 312, the feature layer 302-$n$-1 may perform a non-linear transformation, and the feature layer 302-$n$ may perform a convolution. In another example, the feature layer 302-1 may apply an image filter to the training images 312, the feature layer 302-2 may perform a Fourier Transform to the training images 312, the feature layer 302-$n$-1 may perform an integration, and the feature layer 302-$n$ may identify a vertical edge and/or a horizontal edge. Other implementations of the feature layers 302 may also be used to extract features of the training images 312.

In certain implementations, the output of the feature layers 302 may be provided as input to a classification layer 304. The classification layer 304 may be configured to identify a merchandise, such as the merchandise 102 or one of the store merchandises 314 and/or provide a merchandise identification (ID) label associated with the identified merchandise.

In some implementations, the classification layers 304 may output the merchandise ID label. A classification error component 306 may receive the merchandise ID label and a ground truth merchandise ID as input. The ground truth merchandise ID may be the "correct answer" provided by a trainer (not shown) to the neural network 300 during training. For example, the neural network 300 may compare the merchandise ID label to the ground truth merchandise ID to determine whether the classification layer 304 properly identifies merchandise associated with the merchandise ID label.

In some instances, the neural network 300 may include a feedback component 308. Based on the merchandise ID label and the ground truth merchandise ID, the classification error component 306 may output a merchandise error into the feedback component 308. The feedback component 308 may receive the merchandise error and provide one or more updated parameters 320 to the feature layers 302 and/or the classification layer 304. The one or more updated parameters 320 may include modifications to parameters and/or equations to reduce the merchandise error.

In some examples, the neural network 300 may include a flatten function 330 that generates a final output of the feature extraction step. For example, the flatten function 330 may be an operator that transforms a matrix of features into a vector. The output of the neural network 300 may include a vector describing features of a merchandise, such as the merchandise 102.

During operation, the feature layers 302 of the neural network 300 may receive the training images 312. The feature layers 302-1, 302-2 . . . , 302-n-1, 302-n may identify features in the training images 312. The feature layers 302 may send the identified features to the classification layer 304. The classification layer 304 may receive the identified features. In some implementations, the identified features may be numerical representations (e.g., numbers, vectors, matrix, etc.) that enable the classification layer 304 to identify the store merchandises 314.

In some variations, the classification layer 304 may receive the identified features from the feature layers 302. Based on the received identified features, the classification layer 304 may provide a merchandise ID label of a merchandise in the training images 312. The merchandise ID label may be an identifier (e.g., alpha-numeric) associated with a merchandise in the training images 312.

In certain implementations, the classification error component 306 may receive the merchandise ID label and the ground truth merchandise ID as input. The classification error component 306 may compare the merchandise ID label and the ground truth merchandise ID and generate a merchandise error. The merchandise error may be inversely proportional to a probability that the merchandise ID label matches the ground truth merchandise ID. For example, if there is a high probability (e.g., greater than 95%) that the merchandise ID label matches the ground truth merchandise ID, the merchandise error may be small.

In some instances, the feedback component 308 may transmit the one or more updated parameters 320 to the feature layers 302 and/or the classification layer 304. The one or more updated parameters 320 may adjust the parameters and/or algorithms used by the feature layers 302 and/or the classification layer 304.

In some examples, the training of the neural network 300 includes reducing the merchandise error. Reduction of the merchandise error may indicate improvements in the ability of the neural network 300 to correctly identify the store merchandises 314 during the training process.

In some instances, the flatten function 330 may provide an output of the neural network. For example, the flatten function 330 may be an operator that transforms a matrix of features into a vector.

Figure 4:
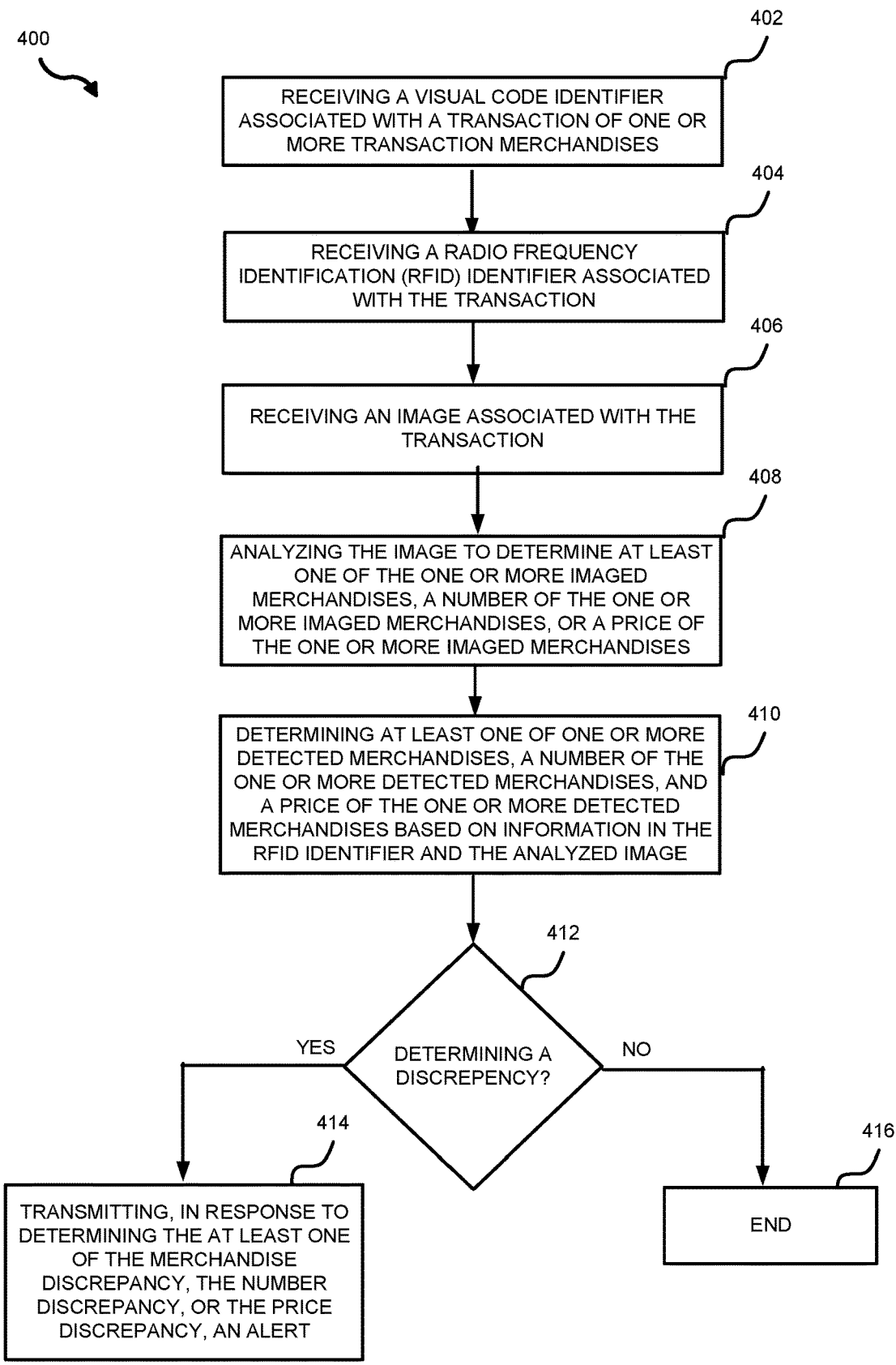
FIG. 4 illustrates an example of a method for implementing the loss prevention technique using image analytics in accordance with aspects of the present disclosure.

Turning to FIG. 4, an example of a method 400 for loss prevention may be performed by the server 140 and/or one or more of the communication component 142, the merchandise component 144, the identification component 146, and/or the AI component 148.

At block 402, the method 400 may receive a visual code identifier associated with a transaction of one or more transaction merchandises, wherein the visual code identifier indicates at least one of the one or more transaction merchandises, a number of the one or more transaction merchandises, or a price of the one or more transaction merchandises. For example, the communication component 142 of the server 140 may receive a visual code identifier from the visual code scanner 106. The visual code scanner 106 may obtain the visual code identifier by scanning the visual code 108 attached to the merchandise 102. In some instances, the visual code 108 may be associated with a cheaper merchandise (e.g., lower price of $50). The customer 124 and/or the clerk 126 may move the visual code 108 from the cheaper merchandise to the merchandise 102 in an attempt to pay the lower price of $50 instead of the higher price of $100 associated with the merchandise 102. In other implementations, the clerk 126 may input the price indicator (e.g., $50, the stock-keeping unit, or other identifiers associated with the cheaper merchandise into the cash register 128).

At block 404, the method 400 may receive a radio frequency identification (RFID) identifier associated with the transaction, wherein the RFID identifier indicates at least one of one or more scanned merchandises, a number of the one or more scanned merchandises, or a price of the one or more scanned merchandises. For example, the communication component 142 of the server 140 may receive a visual code identifier from the RFID reader 112. The RFID reader 112 may obtain the RFID identifier by scanning the RFID tag 104 associated with the merchandise 102. The RFID identifier may indicate that the price of the merchandise 102 is $100.

At block 406, the method 400 may receive an image associated with the transaction. For example, the communication component 142 may receive the one or more images 130.

At block 408, the method 400 may analyze the image to determine at least one of one or more imaged merchandises, a number of the one or more imaged merchandises, or a price of the one or more imaged merchandises. For example, the AI component 148 may train the neural network 300 to identify a number and/or type of merchandises via the one or more images 130. The identification component 146 may utilize the trained neural network 300 to identify the merchandise 102 as described above. In one example, the neural network 300, after training, may receive the one or more images 130. The neural network 300 may utilize the trained feature layers 302 to identify imaged merchandises (e.g., merchandise 102) and the number of imaged merchandises (e.g., 1) in the one or more images 130.

At block 410, the method 400 may determine at least one of one or more detected merchandises, a number of the one or more detected merchandises, and a price of the one or more detected merchandises based on information in the RFID identifier and the analyzed image. For example, after identifying the merchandise 102, the merchandise component 144 may determine that the retail price of the merchandise 102 is $100 based on the RFID identifier transmitted by the RFID scanner 112 and/or the neural network 300 identifying the merchandise 102 (and the price) via the one or more images 130. If a discrepancy exists between the information from the RFID identifier and the one or more images 130, the merchandise component 144 may determine to utilize the information in the RFID identifier to determine the detected merchandise, the number of detected merchandise, and/or the price of the detected merchandise. In other implementations, the information from the one or more images 130 may be used. In yet another implementation, the merchandise component 144 may use the lowest price as the detected price. Other algorithms may also be used.

At block 412, the method 400 may determine at least one of a merchandise discrepancy between the one or more transaction merchandises and the one or more detected merchandises, a number discrepancy between the number of the one or more transaction merchandises and the number of the one or more detected merchandises, or a price discrepancy between the price of the one or more transaction merchandises and the price of the one or more detected merchandises. For example, the merchandise component 144 may determine that the price obtained from the visual code identifier (i.e., $50) is different than the price determined via the RFID identifier and/or analyzing the one or more images 130.

At block 414, the method 400 may transmit, in response to determining the at least one of the merchandise discrepancy, the number discrepancy, or the price discrepancy, an alert. For example, the communication component 142 may transmit an alert to the store personnel 170 indicating the discrepancy.

At block 416, the method 400 may end if the first price equals to the second price.

Figure 5:
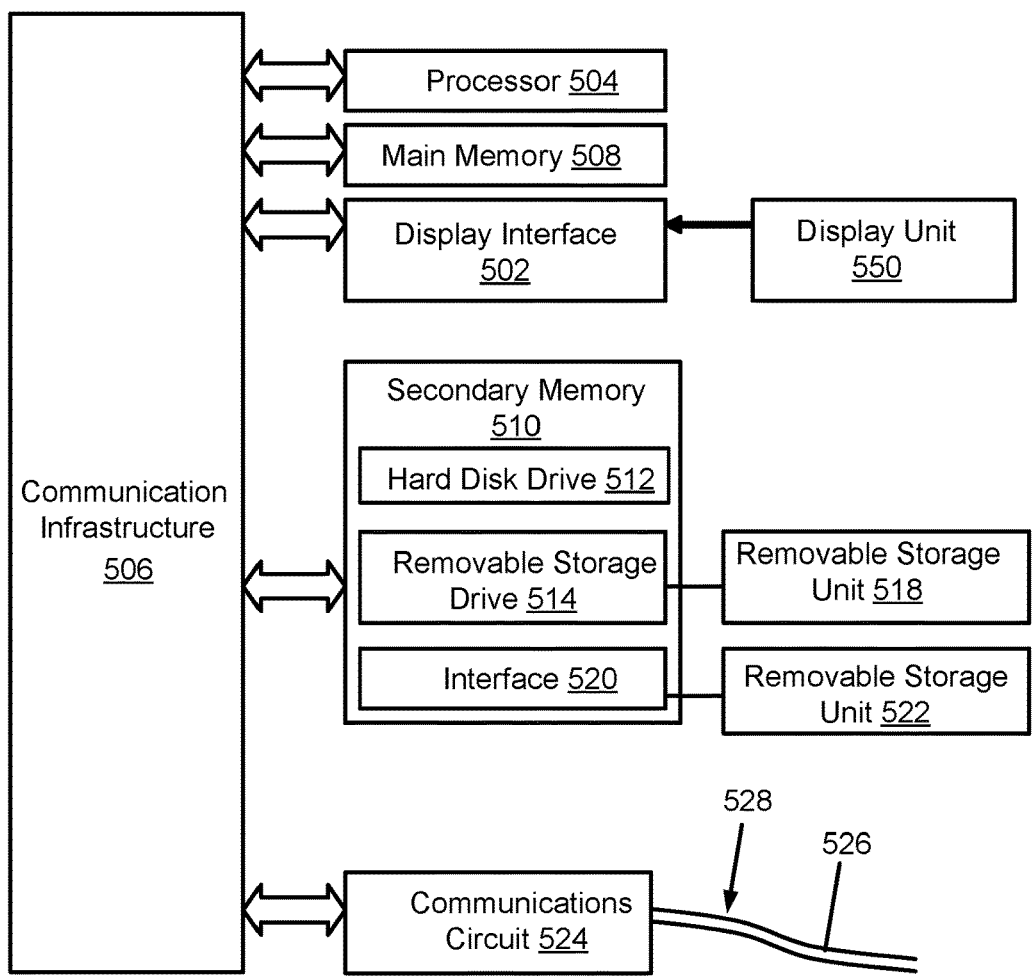
FIG. 5 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 500 is shown in FIG. 5. In some examples, the server 140 may be implemented as the computer system 500 shown in FIG. 5. The server 140 may include some or all of the components of the computer system 500.

The computer system 500 includes one or more processors, such as processor 504. The processor 504 is connected with a communication infrastructure 506 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 500 may include a display interface 502 that forwards graphics, text, and other data from the communication infrastructure 506 (or from a frame buffer not shown) for display on a display unit 550. Computer system 500 also includes a main memory 508, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data. In some examples, one or more of the main memory 508, the secondary memory 510, the removable storage unit 518, and/or the removable storage unit 522 may be a non-transitory memory.

Alternative aspects of the present disclosures may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications circuit 524. The communications circuit 524 may allow software and data to be transferred between computer system 500 and external devices. Examples of the communications circuit 524 may include a modem, a network interface (such as an Ethernet card), a communications port, a Personal Computer Memory Card International Association (PCMCIA) slot and card, etc. Software and data transferred via the communications circuit 524 are in the form of signals 528, which may be electronic, electromagnetic, optical or other signals capable of being received by the communications circuit 524. These signals 528 are provided to the communications circuit 524 via a communications path (e.g., channel) 526. This path 526 carries signals 528 and may be implemented using wire or cable, fiber optics, a telephone line, a cellular link, an RF link and/or other communications channels. In this document, the terms "computer program medium" and "computer usable medium" are used to refer generally to media such as the removable storage unit 518, a hard disk installed in hard disk drive 512, and signals 528. These computer program products provide software to the computer system 500. Aspects of the present disclosures are directed to such computer program products.

Computer programs (also referred to as computer control logic) are stored in main memory 508 and/or secondary memory 510. Computer programs may also be received via communications circuit 524. Such computer programs, when executed, enable the computer system 500 to perform the features in accordance with aspects of the present disclosures, as discussed herein. In particular, the computer programs, when executed, enable the processor 504 to perform the features in accordance with aspects of the present disclosures. Accordingly, such computer programs represent controllers of the computer system 500.

In an aspect of the present disclosures where the method is implemented using software, the software may be stored in a computer program product and loaded into computer system 500 using removable storage drive 514, hard drive 512, or communications interface 520. The control logic (software), when executed by the processor 504, causes the processor 504 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A computer-implemented method of loss prevention in a store, comprising:
    receiving a visual code identifier associated with a transaction of one or more transaction merchandises, wherein the visual code identifier indicates at least one of the one or more transaction merchandises, a number of the one or more transaction merchandises, or a price of the one or more transaction merchandises;
    receiving a radio frequency identification (RFID) identifier associated with the transaction, wherein the RFID identifier indicates at least one of one or more scanned merchandises, a number of the one or more scanned merchandises, or a price of the one or more scanned merchandises;

receiving an image associated with the transaction;

analyzing the image to determine at least one of one or more imaged merchandises, a number of the one or more imaged merchandises, or a price of the one or more imaged merchandises, wherein analyzing the image comprises analyzing the image using a neural network having:
- a plurality of feature layers configured to extract features of the image;
- at least one classification layer configured to output a merchandise identifier label based on the extracted features;
- a classification error component configured to compare the merchandise identifier label with a ground truth merchandise identifier to output a merchandise error; and
- a feedback component configured to output one or more updated parameters to the plurality of feature layers based on the merchandise error;

determining at least one of one or more detected merchandises, a number of the one or more detected merchandises, and a price of the one or more detected merchandises based on information in the RFID identifier and the analyzed image;

determining at least one of a merchandise discrepancy between the one or more transaction merchandises and the one or more detected merchandises, a number discrepancy between the number of the one or more transaction merchandises and the number of the one or more detected merchandises, or a price discrepancy between the price of the one or more transaction merchandises and the price of the one or more detected merchandises; and transmitting, in response to determining the at least one of the merchandise discrepancy, the number discrepancy, or the price discrepancy, an alert.

2. The method of claim 1, further comprises training the neural network to identify a plurality of training merchandises using images of the plurality of training merchandises.

3. The method of claim 1, wherein transmitting the alert comprises transmitting the alert in real time or near real time.

4. The method of claim 3, wherein transmitting the alert further comprises transmitting the alert to a store personnel.

5. The method of claim 1, further comprising, after determining the at least one of the merchandise discrepancy, the number discrepancy, or the price discrepancy, receiving location information from a RFID monitor indicating a location of the one or more transaction merchandises or the one or more detected merchandises.

6. The method of claim 5, further comprising receiving, from one or more cameras, at least one surveillance image of a monitored area near the RFID monitor.

7. The method of claim 6, wherein the at least one surveillance image shows a purchaser leaving the store with the at least one of the one or more transaction merchandises or the one or more detected merchandises.

8. A non-transitory computer readable medium comprising instructions stored therein that, when executed by a processor of a system, cause the processor to:

receive a visual code identifier associated with a transaction of one or more transaction merchandises, wherein the visual code identifier indicates at least one of the one or more transaction merchandises, a number of the one or more transaction merchandises, or a price of the one or more transaction merchandises;

receive a radio frequency identification (RFID) identifier associated with the transaction, wherein the RFID identifier indicates at least one of one or more scanned merchandises, a number of the one or more scanned merchandises, or a price of the one or more scanned merchandises;

receive an image associated with the transaction;

analyze the image to determine at least one of one or more imaged merchandises, a number of the one or more imaged merchandises, or a price of the one or more imaged merchandises, wherein analyzing the image comprises analyzing the image using a neural network having:
- a plurality of feature layers configured to extract features of the image;
- at least one classification layer configured to output a merchandise identifier label based on the extracted features;
- a classification error component configured to compare the merchandise identifier label with a ground truth merchandise identifier to output a merchandise error; and
- a feedback component configured to output one or more updated parameters to the plurality of feature layers based on the merchandise error;

determine at least one of one or more detected merchandises, a number of the one or more detected merchandises, and a price of the one or more detected merchandises based on information in the RFID identifier and the analyzed image;

determine at least one of a merchandise discrepancy between the one or more transaction merchandises and the one or more detected merchandises, a number discrepancy between the number of the one or more transaction merchandises and the number of the one or more detected merchandises, or a price discrepancy between the price of the one or more transaction merchandises and the price of the one or more detected merchandises; and transmit, in response to determining the at least one of the merchandise discrepancy, the number discrepancy, or the price discrepancy, an alert.

9. The non-transitory computer readable medium of claim 8, further comprises instructions that, when executed by the processor, cause the processor to train the neural network to identify a plurality of training merchandises using images of the plurality of training merchandises.

10. The non-transitory computer readable medium of claim 8, wherein the instructions for transmitting the alert comprises instructions for transmitting the alert in real time or near real time.

11. The non-transitory computer readable medium of claim 8, wherein the instructions for transmitting the alert comprises instructions for transmitting the alert to a store personnel.

12. The non-transitory computer readable medium of claim 8, further comprising instructions that, when executed by the processor, cause the processor to receive, after determining the at least one of the merchandise discrepancy, the number discrepancy, or the price discrepancy, location information from a RFID monitor indicating a location of the one or more transaction merchandises or the one or more detected merchandises.

13. The non-transitory computer readable medium of claim 12, further comprising instructions that, when executed by the processor, cause the processor to receive, from one or more cameras, at least one surveillance image of a monitored area near the RFID monitor.

14. The non-transitory computer readable medium of claim 13, wherein the at least one surveillance image shows a person leaving the store with the at least one of the one or more merchandises or the imaged merchandise.

15. A system, comprising:
memory that stores instructions; and
a processor configured to execute the instructions to:
  receive a visual code identifier associated with a transaction of one or more transaction merchandises, wherein the visual code identifier indicates at least one of the one or more transaction merchandises, a number of the one or more transaction merchandises, or a price of the one or more transaction merchandises;
  receive a radio frequency identification (RFID) identifier associated with the transaction, wherein the RFID identifier indicates at least one of one or more scanned merchandises, a number of the one or more scanned merchandises, or a price of the one or more scanned merchandises;
  receive an image associated with the transaction;
  analyze the image to determine at least one of one or more imaged merchandises, a number of the one or more imaged merchandises, or a price of the one or more imaged merchandises, wherein analyzing the image comprises analyzing the image using a neural network having:
    a plurality of feature layers configured to extract features of the image;
    at least one classification layer configured to output a merchandise identifier label based on the extracted features;
    a classification error component configured to compare the merchandise identifier label with a ground truth merchandise identifier to output a merchandise error; and
    a feedback component configured to output one or more updated parameters to the plurality of feature layers based on the merchandise error;
  determine at least one of one or more detected merchandises, a number of the one or more detected merchandises, and a price of the one or more detected merchandises based on information in the RFID identifier and the analyzed image;
  determine at least one of a merchandise discrepancy between the one or more transaction merchandises and the one or more detected merchandises, a number discrepancy between the number of the one or more transaction merchandises and the number of the one or more detected merchandises, or a price discrepancy between the price of the one or more transaction merchandises and the price of the one or more detected merchandises; and
  transmit, in response to determining the at least one of the merchandise discrepancy, the number discrepancy, or the price discrepancy, an alert.

16. The system of claim 15, wherein the processor is further configured to execute the instructions to train the neural network to identify a plurality of training merchandises using images of the plurality of training merchandises.

17. The system of claim 16, wherein the processor is further configured to execute the instructions to transmit the alert in real time or near real time.

18. The method of claim 1, wherein the one or more updated parameters based on the merchandise error include at least one of modifications to parameters to reduce the merchandise error or equations to reduce the merchandise error.

19. The method of claim 1, wherein analyzing the image using a neural network further comprises outputting a vector describing features of the one or more detected merchandises according to a flatten function that transforms a matrix of features into the vector.

20. The method of claim 1, further comprising:
generating a plurality of training images;
receiving a plurality of ground truth identifiers associated with the plurality of training images; and
training the neural network based on the plurality of training images and the plurality of ground truth identifiers.

* * * * *